US008169298B2

(12) United States Patent
Wiesner et al.

(10) Patent No.: US 8,169,298 B2
(45) Date of Patent: May 1, 2012

(54) ELECTRIC HAND TOOL DEVICE AND BATTERY PACK THEREFOR

(75) Inventors: Bernd Wiesner, Owen (DE); Jochen Graeber, Bissingen (DE)

(73) Assignee: Metabowerke GmbH (DE)

( * ) Notice: Subject to any disclaimer, the term of this patent is extended or adjusted under 35 U.S.C. 154(b) by 1050 days.

(21) Appl. No.: 12/090,418

(22) PCT Filed: Nov. 18, 2005

(86) PCT No.: PCT/EP2005/012342

§ 371 (c)(1), (2), (4) Date: Apr. 16, 2008

(87) PCT Pub. No.: WO2007/057037

PCT Pub. Date: May 24, 2007

(65) Prior Publication Data

US 2008/0238609 A1 Oct. 2, 2008

(51) Int. Cl.
*H04L 9/32* (2006.01)

(52) U.S. Cl. ...................... 340/5.61; 340/5.2; 340/10.33

(58) Field of Classification Search .................. 340/5.2, 340/5.61, 5.62, 5.63, 5.64, 10.1, 10.5, 12.22, 340/12.51, 13.26, 572.1, 10.33; 173/2, 217; 320/114

See application file for complete search history.

(56) References Cited

U.S. PATENT DOCUMENTS

2004/0108120 A1* 6/2004 Wiesner et al. .................. 173/2
2005/0035659 A1* 2/2005 Hahn et al. .................. 307/10.2
2006/0071753 A1* 4/2006 Lamar ........................... 340/5.6
2006/0087283 A1* 4/2006 Phillips et al. ................ 320/114

FOREIGN PATENT DOCUMENTS

DE 38 03 357 8/1989
DE 44 29 206 A1 3/1996
DE 100 29 138 A1 1/2002
DE 102 38 710 A1 3/2004
DE 103 09 703 A1 9/2004
WO WO 97/23986 * 7/1997

* cited by examiner

*Primary Examiner* — Edwin Holloway, III

(74) *Attorney, Agent, or Firm* — Paine Hamblen LLP

(57) ABSTRACT

The invention relates to a battery-operated electric hand tool device (2) comprising control electronics (14), a wirelessly and contactlessly responding transceiver (12), and a storage unit (16) in which an authorization code is stored, a locked mode of operation and a released mode of operation being distinguishable. In order to improve theft protection, a wire-bound or wireless interface (22) is provided from the control electronics (14) of the electric hand tool device to a battery pack (4) such that locking data can be transmitted from the control electronics (14) of the electric hand tool device (2) to the battery pack (4), be stored in a storage device (24) of the battery pack (4), and be read out of the storage device (24) again.

5 Claims, 1 Drawing Sheet

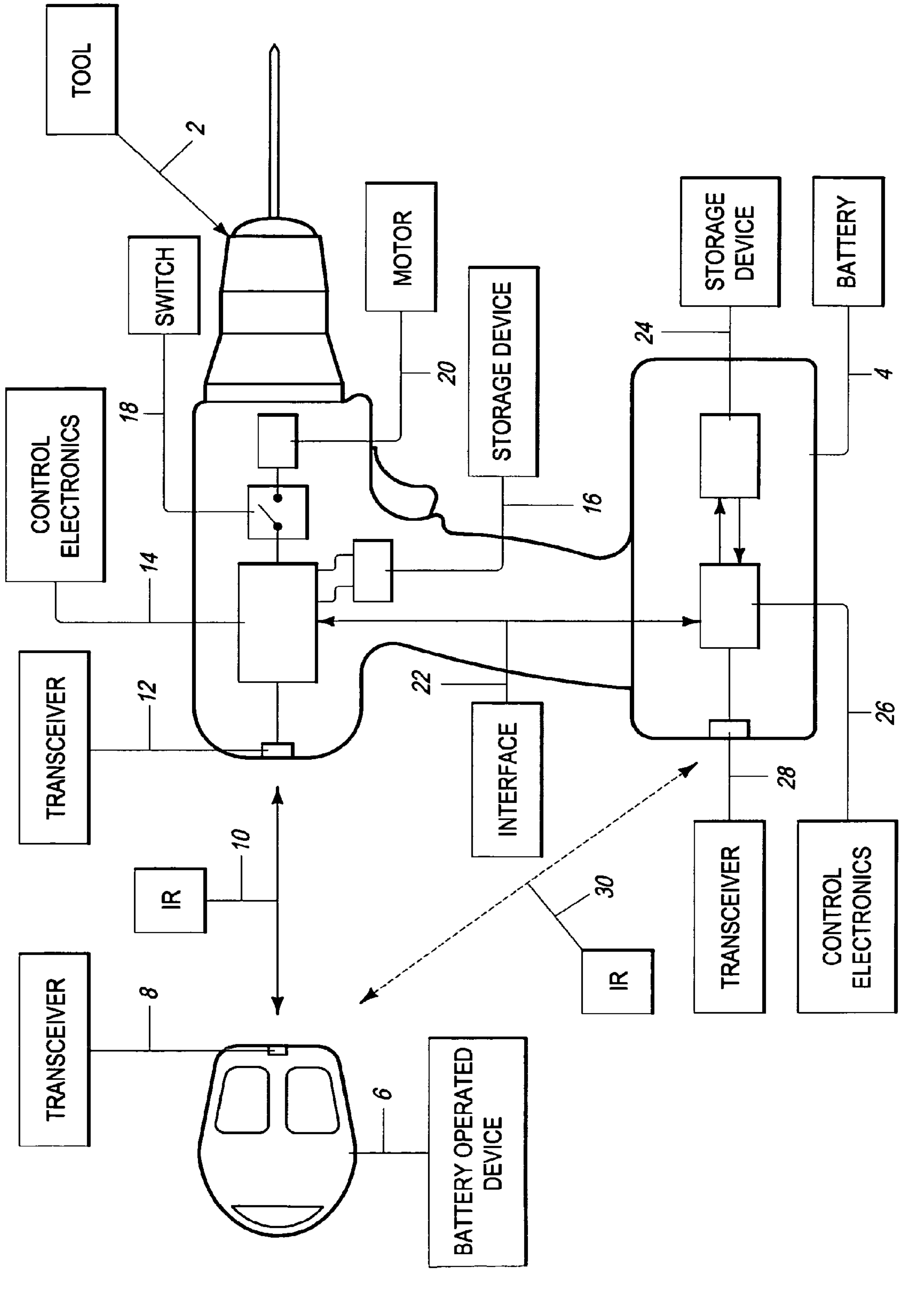
TOOL
2
SWITCH
MOTOR
STORAGE DEVICE
CONTROL ELECTRONICS
18
20
14
16
TRANSCEIVER
12
22
INTERFACE
STORAGE DEVICE
24
BATTERY
4
26
28
TRANSCEIVER
CONTROL ELECTRONICS
IR
10
IR
30
TRANSCEIVER
8
6
BATTERY OPERATED DEVICE

ELECTRIC HAND TOOL DEVICE AND BATTERY PACK THEREFOR

The invention relates to a battery operated hand-held power tool with control electronics and a transceiving device that can be addressed in a wireless and non-contact fashion as well as a storage device in which an authorization code is stored with distinguishable locked and released modes of operation. In addition, the invention relates to a rechargeable battery pack for such a device.

Such a hand-held power tool interacts with an essentially miniaturized separate external device that exhibits a battery operated transceiving device and can be carried along by the user. By using this separate control unit, it is possible to place the hand-held power tool—intentionally triggered by the user—in a locked mode of operation or in a released mode of operation in which the device can be used. Such a hand-held power tool is described in DE 102 38 710 A1 and DE 103 09 703 A1 of the applicant. The latter document is concerned with making theft of hand-held power tools in the released mode of operation as unattractive as possible, which is achieved by the hand-held power tool requesting from time to time an authorization code signal from the external device carried by the authorized user. If no respective authorization code signal is received, then the unit will be placed in the locked state and will no longer be operable by an unauthorized thief.

Other hand-held power tools with theft protection devices are known extensively. For example, DE 44 29 206 C2 suggests a theft protection device, where every time a freshly charged battery is plugged in, or the mains connector plug is plugged into the mains outlet, a test routine begins to run that checks for the presence of a code signal that is to be sent continuously. If no code signal is received within a specified period, the machine is placed in the locked mode of operation. However, if the correct code signal is received, the machine will remain in a released mode of operation until the mains plug is pulled or plugged in again or the rechargeable battery is replaced or becomes empty. Thus, according to DE 44 29 206 C2, an attempt is made to make theft unattractive in that the released mode of operation remains for only a limited time after the hand-held power tool is removed from the code signal transmitter, i.e., at the longest until the next battery change. The mentioned code signal transmitter is not housed in an external separate device that can be taken along but according to the documents is provided at a fixed location, for example in a tool room. This shall ensure that the hand-held power tool is operated only at an authorized work location. In addition, the mentioned device has a disadvantage in that for proper operation the code signal must be transmitted essentially continuously in the direction of the hand-held power tool. At least during renewed start-up after a battery change or after plugging in the mains plug, the code signal must be transmitted for a relatively long period. During this time, the code signal transmitter must be supplied with power. Thus, it must be either connected to a battery charger such that the code signal is transmitted for an extended period at least after removing the battery from the charger or the code transmitter must be connected to a power supply continuously. In any case, it would not be possible to provide the code signal transmitter in a separate external device that can be carried along, because for practical reasons the required power supply could not be ensured with usual batteries. On the foundation of the concept known from DE 44 29 206 C2, designing the code signal transmitter as an external device that can be taken along, in particular in the size of a key chain, would not be suitable because the battery life would be too short. A theft protection device for the rechargeable battery pack is not provided.

Furthermore, from DE 100 29 138 A1, a hand-held power tool is known with a theft protection device on a transponder basis. The hand-held power tool exhibits a transceiving device. Its control electronics is continuously intent upon assuming a locked mode of operation in which the unit cannot be operated. A user needs a transponder if he wants to operate the unit. An electromagnetic field is transmitted by the machine that supplies energy to a transponder accommodated, for example, in a wristband, such that it can emit this authorization code signal, which in turn is received by the transceiving device of the hand-held power tool. However, the transponder has to be in the immediate vicinity of the hand-held power tool; otherwise it cannot obtain the energy required for transmitting the authorization code signal. If the authorization code signal transmitted by the transponder matches the one stored in the memory device of the hand-held power tool, the unit is placed in the released mode of operation and can be operated. The signal source sampling described above is then carried out intermittently. The hand-held power tool remains operational only as long as this communication identifies an authorized user.

A transponder obtains the energy required for its operation from the electromagnetic field acting upon it. For this reason, it is essential that the transponder is placed in the immediate vicinity of the hand-held power tool in order to allow for the release of the unit. As soon as a user departs briefly, the unit will return to the locked mode of operation, which can prove to be annoying in practical applications. A theft protection device for the rechargeable battery pack is not provided.

It is the objective of the present invention to make the theft of battery-operated hand-held power tools and of battery packs for such tools even less attractive.

According to the invention this objective is achieved in that a wired or wireless interface is provided from the control electronics of the hand-held power tool to a battery pack such that the locking data can be transmitted from the control electronics of the hand-held power tool to the battery pack and stored in a storage device of the battery pack and then retrieved again from said storage device. In the manner subject to the invention, the battery pack is integrated or included in the theft protection device of the hand-held power tool. In a sense, the interface of the hand-held power tool to an external transceiving device is used for the battery pack as well. Locking data that the hand-held power tool receives externally via a transceiving device are transmitted via the mentioned wired or wireless interface between the control electronics of the hand-held power tool and the battery pack to the battery pack and are stored there. Thus, the control electronics of the hand-held power tool can actively assume the theft protection for the battery pack as well by providing the locking data to the battery pack and storing them in the storage device of the battery pack and in the reverse way, locking data can be retrieved from the storage device of the battery pack and processed further in the control electronics of the hand-held power tool. For these purposes, it is advantageous that it is not necessary to provide a sophisticated control electronics with an evaluation logic in the battery pack; rather it is in principle sufficient that a storage device is provided in the battery pack that can be addressed or queried via the control electronics of the hand-held power tool using the mentioned interface. However, it shall be noted expressly that in addition, computing capacities may be provided in the battery pack, in particular to perform additional functions and, where applicable, for purposes of interacting with a charger.

It would be conceivable and advantageous that the control electronics of the hand-held power tool is designed such that the locking data are transmitted to the battery pack and/or retrieved from the storage device of the battery pack via the interface at one or more predetermined times or time intervals or when specified or specifiable conditions are present. In this fashion, it is then possible to check or verify again and again that a user authorization exists for the currently employed or used battery pack.

Advantageously, the control electronics of the hand-held power tool can also be designed such that when connecting a battery pack with the hand-held power tool, an authorization code or locking data in the broadest sense stored in the storage device of the hand-held power tool are automatically transmitted via the interface to the battery pack and are there stored in the memory device of the battery pack and/or that an authorization code stored in the storage device of the battery pack can be retrieved and passed on to the control electronics of the hand-held power tool via the interface.

It is additionally recommended to design the control electronics of the hand-held power tool such that starting from a released mode of operation of the hand-held power tool at one or more pre-specified times or when specified or specifiable conditions are present, a request for an authorization code signal is transmitted to an external transceiving device in a device that can be carried along by the user. This offers the advantage that the external transceiving device does not need to be in a continuously transmitting operating mode; rather it is sufficient that a ready-to-receive-state for the mentioned authorization code signal request is provided.

In an even further development of this thought, the external transceiving device is designed such that upon reception of an authorization code signal request, a transmission operating mode can be activated and an authorization code signal is transmitted to the transceiving device of the hand-held power tool and that thereafter the transmission operating mode can be deactivated again automatically. In this fashion, an energy-saving operation of the external transceiving device is possible that can be supplied with energy by one battery over a long period.

Furthermore, the control electronics and the transceiving device of the hand-held power tool are designed such that after evaluating the received authorization code signal and comparing it with the authorization codes stored in the storage device of the hand-held power tool and with the authorization code stored in the storage device of the battery pack and readable via the interface, the hand-held power tool either remains in the released mode of operation or is placed in the locked mode of operation. Thus, the battery pack is again included in the theft protection of the hand-held power tool through the locking data stored there. If the locking data that are to be compared do not match, i.e., a comparison shows that either the hand-held power tool or the battery pack does not contain stored information that matches, for example, the authorization code (code key) transmitted from the named external transceiving device, the continued operation of the unit will be denied in that both the hand-held power tool and the battery pack are placed in a locked mode of operation.

It also proves to be advantageous if the hand-held power tool features a display device for displaying the operational state (released or locked state) of the hand-held power tool and the operational state of the battery pack.

Furthermore, protection is also sought for a battery pack for a hand-held power tool, in particular for a hand-held power tool subject to the invention as described above according to the additional claims 9 and 10. Such a battery pack subject to the invention features—as has already been mentioned—a storage device, where an authorization code can be stored, and a wired or wireless interface to a control electronics of a hand-held power tool or a transceiving device that can be addressed in a wireless or non-contact fashion for communicating with an external transceiving device of an external control unit. The battery pack itself may feature its own programmable control electronics that is capable of discerning between a locked mode of operation and a released mode of operation of the battery pack.

Additional features, details and advantages become apparent from the drawing and the following description of a preferred embodiment of the battery operated hand-held power tool subject to the invention.

In the drawing:

FIG. 1 is a schematic presentation of a hand-held power tool subject to the invention with a battery pack and a device being carried along by an authorized person with an external transceiving device for transmitting locking data.

FIG. 1 shows a battery operated hand-held power tool overall designated with the reference character 2 with a battery pack 4 connected to it and with an external battery operated device 6 that can be carried along by an authorized user with a schematically indicated external transceiving device 8. The transceiving device 8 is capable of communicating with a transceiving device 12 of the hand-held power tool via an interface connection 10, preferably an interface operating in a wireless and non-contact fashion, such as an optical interface (e.g., an infrared interface). It interacts with a control electronics 14 in the hand-held power tool, whereby information obtained via the interface 10 is stored in a storage device 16 and can be retrieved again from there. This information may be an authorization code identifying an authorized user. Other operating parameters concerning the hand-held power tool or its operation can be stored in the storage device 6 as well. Information or data used to place the hand-held power tool in a locked mode of operation or a released mode of operation are subsequently referred to as locking data. As described in DE 103 09 703 A1 of the applicant, such locking data can be provided to the hand-held power tool 2 using an external device 6 that is carried along by the authorized user via the interface 10, and there can be stored in the storage device 6. After specified or specifiable intervals, these locking data are used to check, whether the hand-held power tool, when in the released mode of operation, can continue to be operated or is to be placed into a locked state. For example, the control electronics 14 of the hand-held power tool 2 can be designed such that after a specified or specifiable interval or when specified or specifiable conditions exist, it can transmit an authorization code signal request via the internal transceiving device of the unit via the interface 10. This authorization code signal request is received by the external device 6 via its transceiving device and the external device 6 is activated, i.e., it transitions from an energy-saving receiving mode into an active transmitting mode. The device 6 or its control electronics, respectively, then initiates the transmission of a specified or specifiable authorization code signal via the interface 10 to the hand-held power tool 2. This signal is received via its transceiving device 12 and evaluated by its control electronics 14, i.e., the information content of the signal is determined and compared to the locking data stored in the storage device 16. If the authorization code is correct, the hand-held power tool remains in the released state. If the code is not correct or the hand-held power tool receives no answer to its authorization code signal request, for example because the unit has been taken without permission, i.e., is not with the authorized user and the external device 6, the hand-held power tool is placed into the locked mode of operation. Continued operation is disabled. The means of placing the unit in the locked state is indicated schematically in FIG. 1 by a switch 18 for interrupting the current or voltage supply of an electric motor 20.

According to the invention, the battery pack 4 is also integrated in the theft protection described above. The hand-held power tool possesses an additional wired or wireless interface 22 between the control electronics 14 and the battery pack 4. Preferably, the interface 22 is designed such that it is active only when the hand-held power tool is connected with the battery pack 4 for the intended use. However, it is also conceivable to design a wireless and non-contact interface 22, such that a bidirectional communication between the hand-held power tool 2 and the battery pack 4 is possible even when they are in proximity of each other, however not (yet) connected to each other for the intended use. Via the interface 22, locking data in the broadest sense received from the external device 6 can be transmitted from the control electronics 14 of the hand-held power tool to the battery pack 4 and can there be stored in a storage device 24 or retrieved from said storage device 24, respectively. Fundamentally, it would be sufficient for the battery pack to feature only one storage device that can be written to or retrieved, initiated by the control electronics 14 of the hand-held power tool 2. However, it is also conceivable and advantageous for the battery pack 4 to include its own control electronics 26, in particular if it is a lithium ion battery pack. Especially in such a case it would be conceivable and advantageous for the battery pack to have its own transceiving device 28 that is addressed in a wireless and non-contact fashion and that, in principle, could in constitute an interface 30 with the external device 6.

In one preferred embodiment of the invention, the hand-held power tool 2 or its control electronics 4, respectively, is designed such that locking data received via the interface 10 are both stored in the internal storage device 16 of the unit as well as provided to the battery pack 4 via the interface 22 and stored in the storage device 24 of the battery pack. When during an authorization query either the locking data stored in the storage device 24 of the battery pack 4 or the locking data stored in the storage device 16 of the hand-held power tool 2 do not match a authorization code signal received by the external device 6, then both the hand-held power tool 2 and the battery pack 4 will be placed in a locked mode of operation. To this end, the control electronics 26 of the battery pack 4 can, for example, prevent the current or voltage supply of the battery cells to the consumer via a not shown switch, until it has been taken actively out of this locked mode of operation and again placed in a released mode of operation.

The invention claimed is:

1. A battery operated power tool, comprising:

an external battery operated device carried by a user, and which is periodically energized to place it in a transmission operating mode so as to transmit and receive a source of locking data, including an authorization code which is stored therein, and wherein the periodic energizing of the external battery operated device extends the battery life of the external battery operated device;

a first control electronics assembly mounted on the battery operated power tool and which wirelessly communicates with the external battery operated device, and which periodically receives from, and transmits to external battery operated device, the locking data and the authorization code, and wherein the transmission of the locking data and the authorization code to the external battery operated device causes the external battery operated device to become energized, and operate in the transmission operating mode;

a first storage device mounted on the battery operated tool, and which is electrically coupled with the first control electronic assembly, and which further, receives and stores the locking data and the authorization code which is transmitted from the external battery operated device, and is received by the first control electronics assembly;

an electrically energizable motor mounted on the battery operated power tool, and which is operatively coupled with the first control electronics assembly, and wherein the locking data and authorization code received by the first control electronics assembly allows for the selective electrical energizing of the motor during a released mode of operation, and to electrically deenergize the motor in a locked mode of operation;

a rechargeable battery pack which releasably, matingly cooperates with the battery operated power tool, and which supplies stored electrical power to the motor during the released mode of operation and which does not supply stored electrical power to the motor during the locked mode of operation;

a second control electronics assembly mounted on the rechargeable battery pack and which further communicates with the first control electronics assembly by way of an interface, so as to receive the locking data and authorization code received from external battery operated device, and which has been previously stored in the first storage device;

a second storage device mounted on the rechargeable battery pack, and which is electrically coupled with the second control electronics assembly, and which is operable to receive and store the locking data and authorization code received from the second control electronics assembly and which was previously transmitted to the second control electronics assembly from the first control electronics assembly, and wherein, periodically, during the released mode of operation the first control electronics assembly transmits to, and receives from, the second control electronics assembly the locking data and authorization code previously stored in the second storage device, to verify the continued authorized use of the rechargeable battery pack with the battery operated power tool, and further, periodically, during the released mode of operation, the first control electronics assembly transmits to and receives from the external battery operated device the locking data and authorization code to verify the continued use of the battery operated power tool.

2. A battery operated power tool as claimed in claim 1, and further comprising:

a first transceiving device electrically coupled with the external battery operated device;

a second transceiving device electrically coupled with the first control electronics assembly, and which further periodically communicates with the first transceiving device; and a third transceiving device mounted on the rechargeable battery pack and which is electrically coupled with the second control electronics assembly, and which further communicates with the first transceiving device.

3. A battery operated power tool as claimed in claim 2, and further comprising:

an electrical switch mounted on the battery operated power tool and which is electrically coupled with the motor, and which is operatively controlled by the first control electronics assembly, and wherein during the released mode of operation the electrical switch is electrically closed so as to allow the electrical energy stored in the rechargeable battery to be delivered to, and energize the motor, and in the locked mode of operation the first control electronics assembly causes the electrical switch to open and prevents the delivery of stored electrical power to the motor.

4. A battery operated power tool as claimed in claim 3, and wherein the first control electronics assembly periodically compares the locking data and authorization code received from the external battery operated device, and the second control electronics assembly during the released mode of operation, with the locking data and authorization code previously stored in the first storage device, and is operable to cause the battery operated power tool to assume a locked mode of operation if the received locking data and authorization code is not the same as the locking data, and authorization code stored in the first storage device.

5. A battery operated power tool comprising:

an external battery operated device carried by a user, and which has stored therein locking data which is used to place the battery operated tool into operation, and wherein the locking data is used to place the battery operated tool into a locked mode of operation, or a released mode of operation, and wherein the locking data includes an authorization code, and wherein the external battery operated device further has a first transceiving device which receives, and wirelessly transmits the locking data to the battery operated power tool, and wherein the external battery operated device has a transmission operating mode which is periodically energized and deenergized to extend the battery life of the external battery operated device, and wherein, during the transmission operating mode, the locking data is received from, or transmitted to, the battery operated power tool;

a first control electronics assembly mounted on a main body of the battery operated power tool, and which has a second transcieving device which wirelessly communicates with the first transcieving device, and which further receives the locking data, and the authorization code, from the external battery operated device, and further periodically transmits the authorization code and locking data back to the external battery operated device so as to cause the external battery operated device to operate in the transmission operating mode, and wherein the first control electronics assembly further has a first storage device which is coupled in data transmitting and receiving relation relative to the first transceiving device, and which further receives, and stores the locking data and the authorization code transmitted by the external battery operated device;

an electrically energizable motor borne by the battery operated power tool;

an electrical switch mounted on the battery operated power tool, and which is electrically connected with the motor, and controllably coupled with the first control electronics assembly, and wherein the locking data and authorization code received, and stored by, the first storage device permits the first control electronics assembly to controllably operate the electrical switch so that upon closing the electrical switch, the motor is energized, and the battery operated power tool assumes the released mode of operation, or further, when the electrical switch is open, causes the motor to be deenergized such that the battery operated tool assumes the locked mode of operation; and a rechargeable battery pack which releasably, matingly, cooperates with the battery operated power tool, and which supplies stored electrical power to energize the motor when the battery operated power tool is in the released mode of operation, and wherein the battery pack has a second control electronics assembly which communicates with the first control electronics assembly by way of an interface, and wherein a second storage device is borne by the rechargeable battery pack, and which communicates with the second control electronics assembly, and wherein the locking data and authorization code which was previously received, and stored in the first storage device, is transmitted by way of the interface to the second control electronics assembly, and is then received and stored in the second storage device, and wherein the rechargeable battery pack further has a third transceiving device, which communicates with the second control electronics assembly, and which further is operable to transmit and receive from the external battery operated device which is carried by the user the locking data and authorization code, and wherein, periodically, during the released mode of operation of the battery operated power tool, the first control electronics assembly transmits to, and receives from the second storage device the locking data, and authorization code, previously stored in the second storage device to verify the continued authorized use of the battery operated power tool by comparing the received locking data and authorization code sent by the second storage device, with the locking data and authorization code previous stored in the first storage device, and wherein the first control electronics assembly causes the battery powered tool to be placed into the locked mode of operation when the locking data and the authorization code received from the second storage device does not match the same locking data and authorization code stored in the first storage device, and wherein, further, during the released mode of operation of the battery operated power tool the first control electronics assembly periodically transmits by way of the second transceiving device a request for an authorization code to the external battery operated device carried by the user, and wherein the transmission of the request for an authorization code causes the external battery operated device to assume the transmission operating mode so as to cause the authorization code to be transmitted back to the second transceiving device by the external battery operated device, and wherein following transmission of the requested authorization code back to the second transceiver device the external battery operated device terminates the transmission operating mode so as to preserve battery power.

* * * * *